J. B. WEST.
Tire Tightener.
No. 101,330.    Patented March 29, 1870.
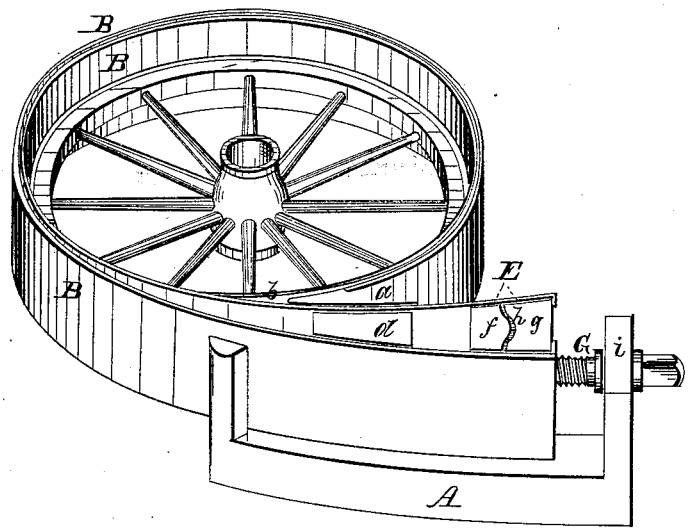
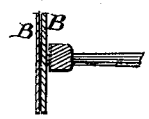
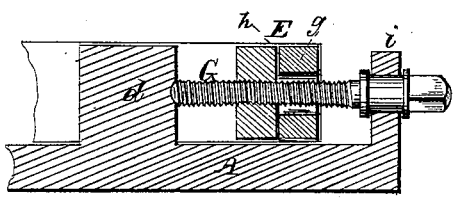
Witnesses.    Inventor.

United States Patent Office.

JONATHAN BURNS WEST, OF GENESEO, NEW YORK.

Letters Patent No. 101,330, dated March 29, 1870.

IMPROVED DEVICE FOR TIGHTENING CARRIAGE-TIRES.

The Schedule referred to in these Letters Patent and making part of the same

*To all whom it may concern:*

Be it known that I, JONATHAN BURNS WEST, of Geneseo, in the county of Livingston and State of New York, have invented a certain new and useful Improvement in Machines for Tightening Tires upon Wheels, of which the following is a specification, referring to the accompanying drawings.

Nature of the Invention.

This invention consists essentially in tightening the tire upon the wheel by means of metallic bands or straps which pass around, closely encircling the wheel, and are straightened or made tight at the end by means of a screw, as hereinafter described.

General Description.

In the drawings—

Figure 1 is a perspective view, with a wheel in place.

Figure 2, a section in the axis of the tightening-screw.

Figure 3, a cross-section through the tightening-bands or straps and the rim of the wheel.

A represents a bed-plate, of any desired form, and usually mounted upon legs.

B B represent two bands or straps, preferably made of steel, and of considerable width.

One end of these bands is bolted or otherwise attached to a solid projection or block, $a$, of the bed-plate.

The end $b$ of the inner band projects inward beyond that of the outer, so as to form a more secure attachment to the block, and its extremity is sharpened or made thin, so as to produce as little break as possible of the bearing upon the tire in the act of compressing.

The bands or straps thus attached are carried around the wheel, one over the other, forming a complete circle, and the loose ends are passed around a fixed block, $d$, to a loose head, E, to which they are secured on opposite sides by bolts or otherwise, as shown.

The head E is made of two parts, $f\,g$, the former constituting a nut to a fixed screw, G, while the latter simply passes over the screw without a screw-thread.

At the junction of the parts $f\,g$ is formed a joint-bearing, $h$, which allows a free turning of one part on the other, serving as a fulcrum.

The screw G is simply fixed in bearing $i$, with its end resting in fixed block $d$; and at its outer end it has a wrench-head, or is otherwise properly arranged to receive the power to be applied.

The action is as follows:

When the screw is turned the nut $f$ draws out, forcing with it the block $g$, and consequently the bands, thereby tightening them upon the tire of the wheel.

The bands are made to draw equally and adapt themselves properly to the wheel, by reason of the joint bearing $h$, which serves as a sort of fulcrum which is self-adjusting. I claim a special novelty in this arrangement, as it prevents any binding or cramping of the outer upon the inner bands. Of course any desired number of bands or straps may be employed.

I have found by practical experiment that tires may be tightened on wheels without removal by the use of these compressing-bands. This not only saves labor, but saves marring of the paint and disfiguring of the wheel.

The several bands have a peculiar relation in their action upon the tire. Each is made thin, to fit closely under the tension to which it is subject, and each acts independently, yet all act as it were in a single body in the compressing action. By the use of two I get the utmost tensile force and bearing contact of each, combined with the strength of a single thick band, which for use on heavy wheels would have to be too thick to easily bend or adapt itself closely to the contact surface which the several thin ones will do.

It is obvious that instead of bands any equivalent tightening devices might be employed.

Claims.

What I claim is—

1. The combination of two or more metallic bands or strips, one over-wrapping the other, attached to a fixed block or bearing at one end, and connected with a screw or other power at the other, and encircling the wheel for the purpose of setting of the tire without removal of the latter from the wheel, as herein described.

2. The combination of the nut $f$ and loose block $g$ with the bands or straps B B, bed-plate A, and the screw G, as herein described.

3. The arrangement of the bed-plate A, bands B B, fixed blocks $a\,d$, nut $f$, loose block $g$, and screw G, the whole operating in the manner and for the purpose specified.

In witness whereof I have hereunto signed my name in the presence of two subscribing witnesses.

JONATHAN BURNS WEST.

Witnesses:
R. F. OSGOOD,
GEO. W. MIATT.